US012732268B1

(12) United States Patent
Shi et al.

(10) Patent No.: US 12,732,268 B1
(45) Date of Patent: Sep. 8, 2026

(54) AUTOMATICALLY PROVISIONING OPTICAL NETWORK TERMINAL (ONT) SERVICES TO PAIRED OPTICAL LINE TERMINAL (OLT) DEVICES

(71) Applicant: Calix, Inc., San Jose, CA (US)

(72) Inventors: Panke Shi, Nanjing Jiangsu (CN); Tian Deng, Nanjing Jiangsu (CN); Yongsheng Xue, Nanjing Jiangsu (CN)

(73) Assignee: Calix, Inc., San Jose, CA (US)

( * ) Notice: Subject to any disclaimer, the term of this patent is extended or adjusted under 35 U.S.C. 154(b) by 218 days.

(21) Appl. No.: 18/776,755

(22) Filed: Jul. 18, 2024

(51) Int. Cl.
*H04B 10/032* (2013.01)
*H04B 10/27* (2013.01)

(52) U.S. Cl.
CPC .......... *H04B 10/032* (2013.01); *H04B 10/27* (2013.01)

(58) Field of Classification Search
CPC ............................ H04B 10/27; H04J 14/0287
See application file for complete search history.

(56) References Cited

U.S. PATENT DOCUMENTS

2007/0058973 A1* 3/2007 Tanaka .................... H04J 14/00 398/1
2007/0124422 A1* 5/2007 Hwang et al. .......... G06F 15/16 709/217
2011/0013903 A1* 1/2011 Rafel Porti et al. ... H04B 10/00 398/1

* cited by examiner

*Primary Examiner* — Kenneth N Vanderpuye
(74) *Attorney, Agent, or Firm* — Staniford Tomita LLP

(57) ABSTRACT

Automating service provisioning for optical network terminals (ONTs) in a broadband network consisting of paired active and standby optical line terminals (OLTs). The OLTs are organized, based on configurable rules, into active and standby protection pairs in a passive optical network (PON). A centralized or cloud-based management system pushes ONT services configurations onto geographically separated protection devices so as to ensure identical service configuration and minimizes service interruption during network reconfiguration. ONT service configurations are extracted by a network management service, and a reverse template process is used to push the configurations onto the OLTs for identical configuration.

20 Claims, 10 Drawing Sheets

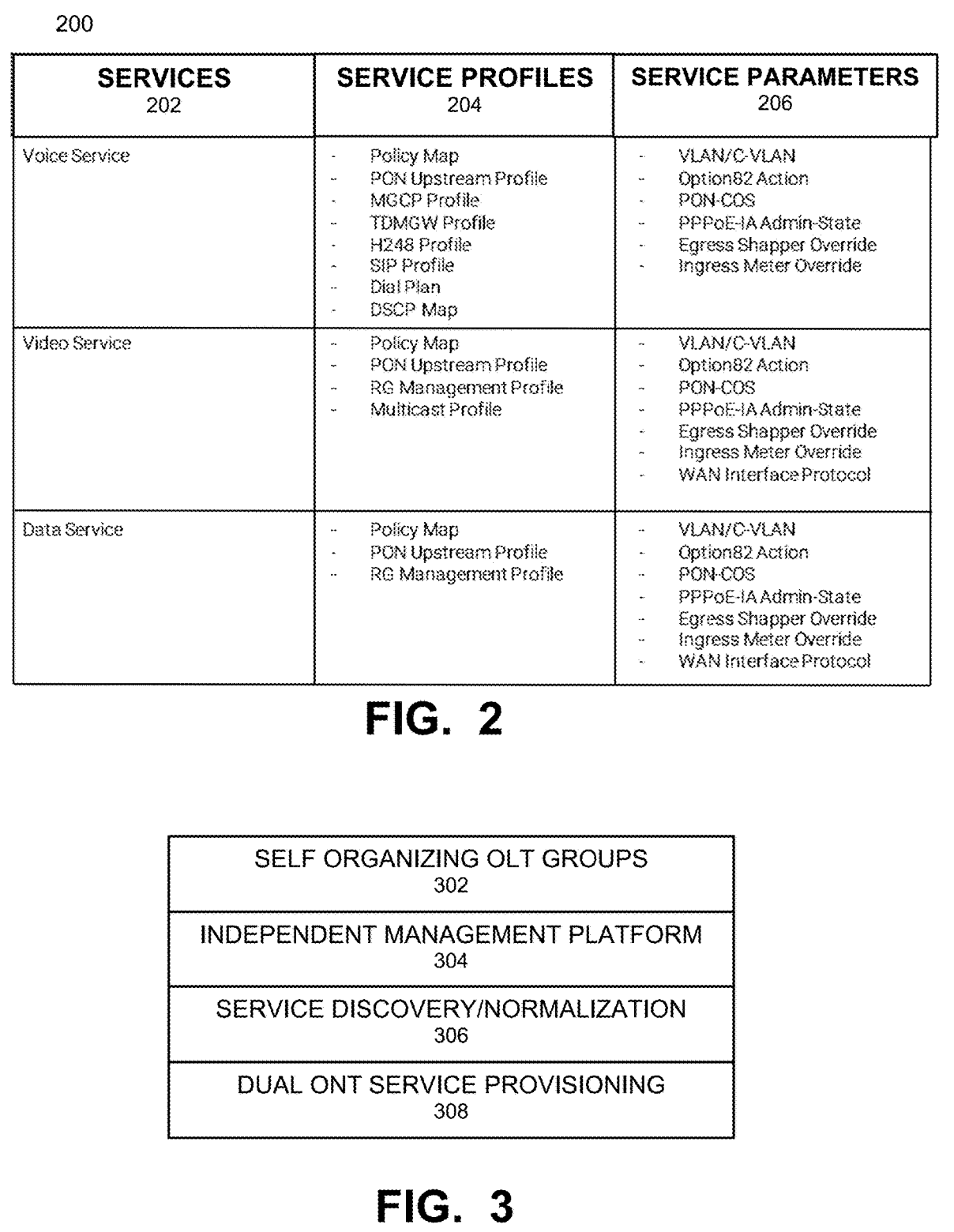

200

| SERVICES 202 | SERVICE PROFILES 204 | SERVICE PARAMETERS 206 |
|---|---|---|
| Voice Service | - Policy Map<br>- PON Upstream Profile<br>- MGCP Profile<br>- TDMGW Profile<br>- H248 Profile<br>- SIP Profile<br>- Dial Plan<br>- DSCP Map | - VLAN/C-VLAN<br>- Option82 Action<br>- PON-COS<br>- PPPoE-IA Admin-State<br>- Egress Shapper Override<br>- Ingress Meter Override |
| Video Service | - Policy Map<br>- PON Upstream Profile<br>- RG Management Profile<br>- Multicast Profile | - VLAN/C-VLAN<br>- Option82 Action<br>- PON-COS<br>- PPPoE-IA Admin-State<br>- Egress Shapper Override<br>- Ingress Meter Override<br>- WAN Interface Protocol |
| Data Service | - Policy Map<br>- PON Upstream Profile<br>- RG Management Profile | - VLAN/C-VLAN<br>- Option82 Action<br>- PON-COS<br>- PPPoE-IA Admin-State<br>- Egress Shapper Override<br>- Ingress Meter Override<br>- WAN Interface Protocol |

FIG. 2

| SELF ORGANIZING OLT GROUPS 302 |
|---|
| INDEPENDENT MANAGEMENT PLATFORM 304 |
| SERVICE DISCOVERY/NORMALIZATION 306 |
| DUAL ONT SERVICE PROVISIONING 308 |

FIG. 3

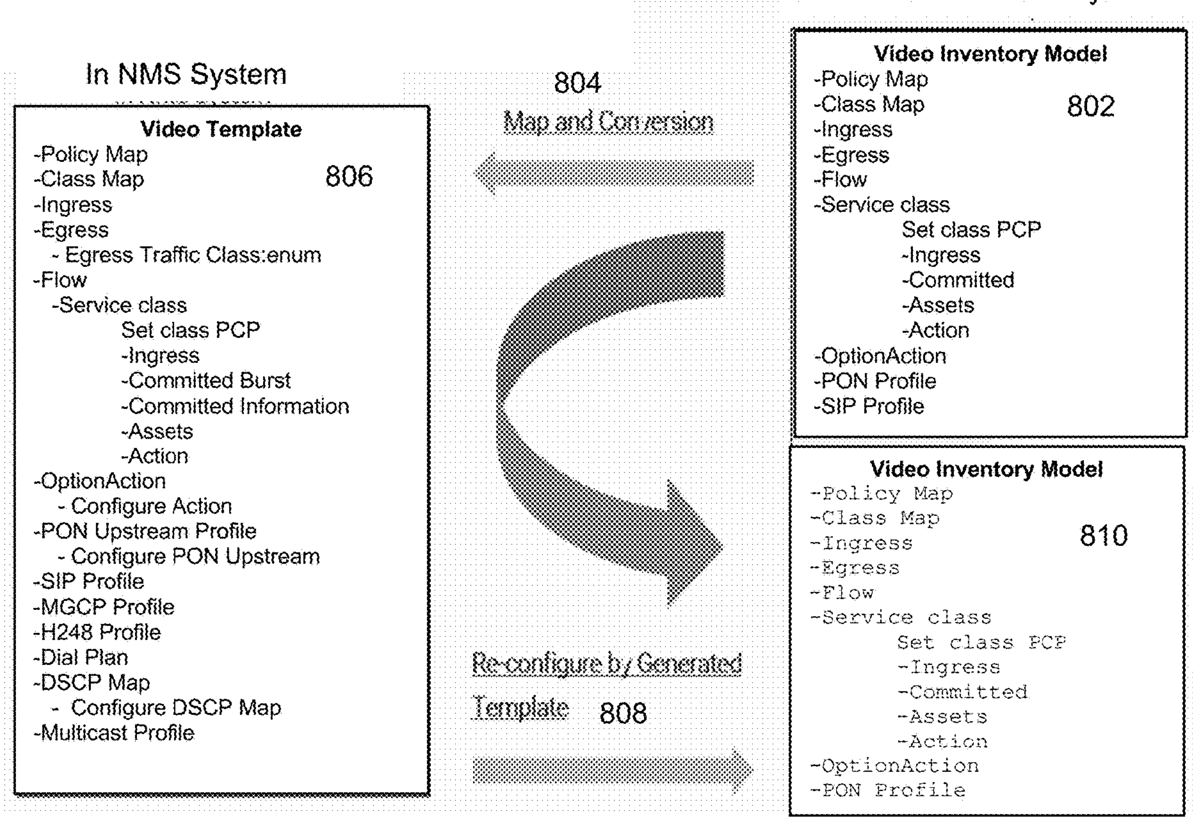
FIG. 8

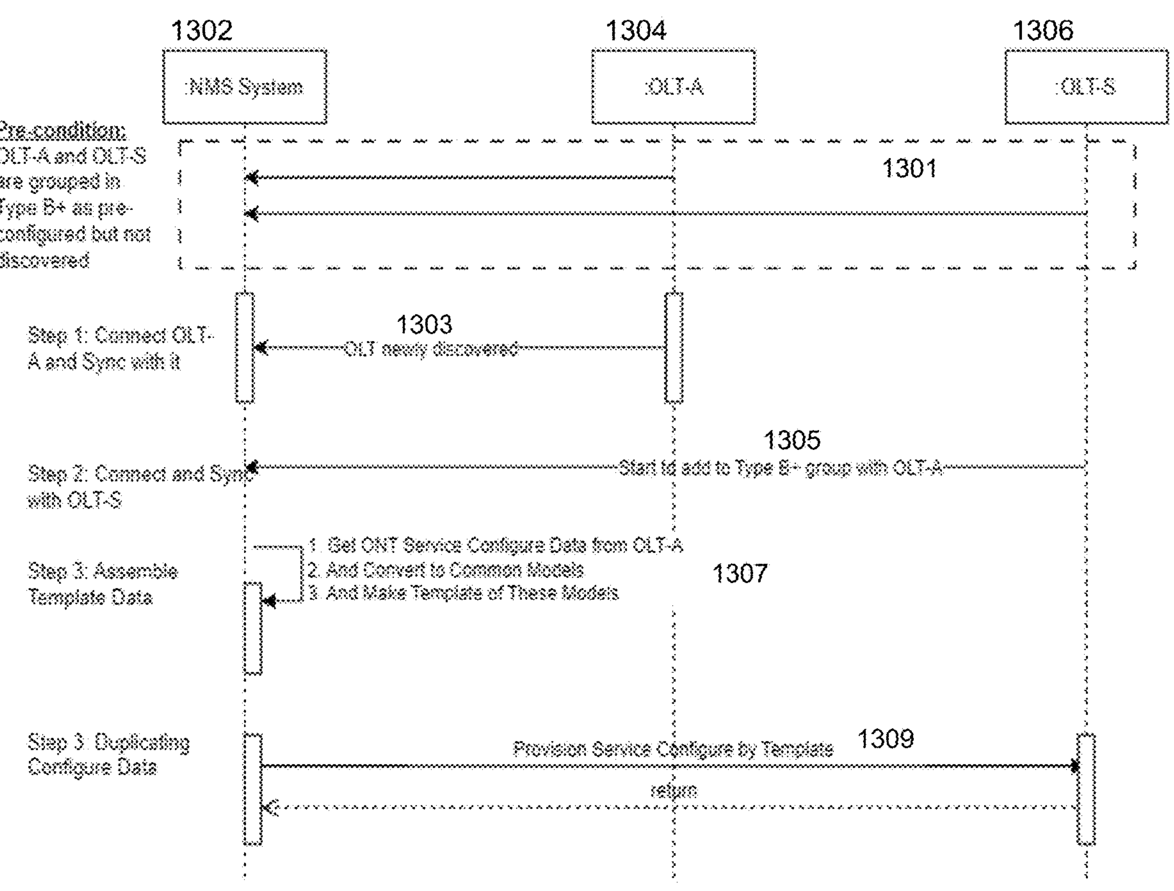
FIG. 13

AUTOMATICALLY PROVISIONING OPTICAL NETWORK TERMINAL (ONT) SERVICES TO PAIRED OPTICAL LINE TERMINAL (OLT) DEVICES

TECHNICAL FIELD

Embodiments relate to the field of broadband communication networks, and more particularly to automatically provisioning services for optical line and network terminals.

BACKGROUND

Broadband is generally known as a high-speed connection that provides access to the Internet through an Internet Service Provider (ISP) or Broadband Service Provider (BSP). A high data rate connection transmits wide bandwidth information over multiple channels at once, allowing for more information to be sent simultaneously. Physical connectivity can be provided over various media such as: cable modem, Digital Subscriber Line (DSL) using existing phone lines, fiber optic networks, wireless (Wi-Fi) networks, and satellite connections. Broadband has become essential for many enterprises as remote usage (employees and customer) has greatly increased. Broadband networks must evolve to meet mission critical needs as network faults (e.g., wire or fiber cuts) can occur, causing service disruptions.

Popular broadband networks utilize Gigabit Passive Optical Networks (PON) with Optical Line Terminal (OLT) devices at the BSP site and Optical Network Terminal (ONT) devices at the user site. Type B protection architectures provide dual-channel redundancy for route resiliency and equipment protection for PON providers. Managing changes to a network, however, such as from adding/dropping users, devices, services, and so on, requires reconfiguration of the ONT services. Present systems rely on manual reconfiguration, which can lead to inconsistencies and prolonged downtime during switchover events. For example, a user must configure the ONT services manually on paired (active/standby) OLTs by device command line, or configure the ONT services pre-defined template to two OLTs separately by a management system.

What is needed, therefore, is an automated reconfiguration system, such as through a centralized or cloud-based management system, that configures ONT services onto geographically separated protection devices so as to ensure identical service settings and minimizes service interruption during network reconfiguration.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF DRAWINGS

In the following drawings, like reference numerals designate like structural elements. Although the figures depict various examples, the one or more embodiments and implementations described herein are not limited to the examples depicted in the figures.

FIG. 2 is a table illustrating example services, service profiles, and service parameters in a broadband system implementing automatic ONT service configuration for a BSP, under some embodiments.

FIG. 3 lists certain sub-processes to implement the automatic, redundant ONT service configuration feature, under some embodiments.

FIG. 8 illustrates generating a dynamic template by mapping extracted device configuration models to common normalized models, under some embodiments.

FIG. 13 illustrates a process for duplicating ONT services to an unconnected pre-configured OLT pair, under some embodiments.

DETAILED DESCRIPTION

Figure 1:
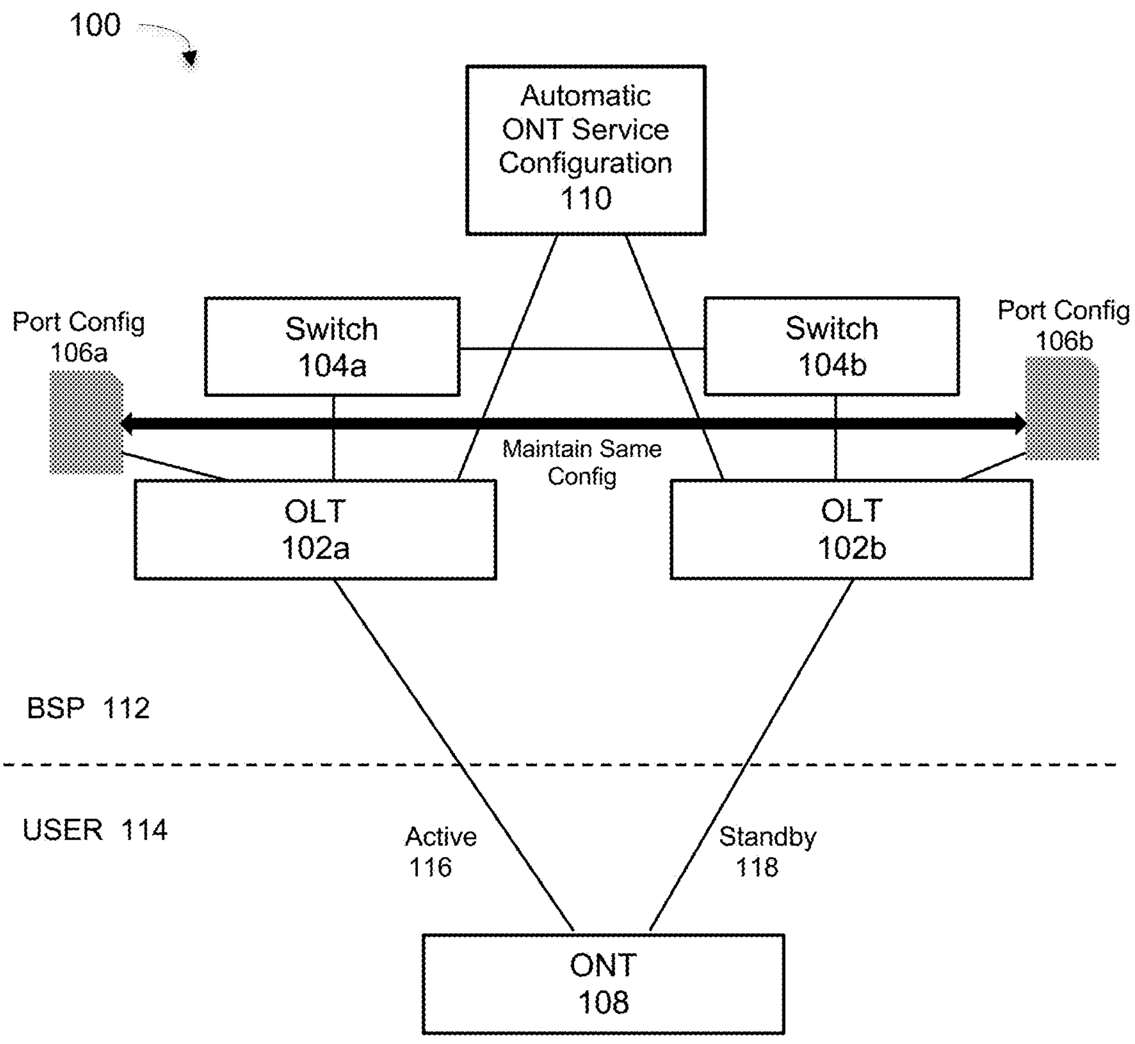
FIG. 1 illustrates a broadband system implementing automatic ONT service configuration for a BSP, under some embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can be combined, occur, or be performed simultaneously, at the same point in time, or concurrently.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

As mentioned above, broadband networks operated by a BSP provide Type B protection switchover mechanisms. To effectively recover from any failure condition, physical and logical fiber links must switch over without service interruption, and ONT service configurations must be identically duplicated onto both active and standby OLTs ahead of time. Current systems that use manual service provisioning suffer from inconsistencies and long downtimes during ONT protection switching events. Embodiments provide an automated process to provision ONT services onto redundant equipment in order to drastically reduce switchover downtimes can be drastically reduced while ensuring uninterrupted continuity of mission-critical broadband services. In general, an OLT provides centralized management of the PON network for network-wide traffic, while an ONT serves as a localized bridge handling traffic for individual user premises.

It should be noted that Type B protection involves protection mechanism within a particular OLT, but in different PON ports. The protection scheme may also include Type B+ protection, which works within two different OLT devices, and thus provides some degree of geographical protection. Embodiments of system 100 work with either Type B or Type B+ protection.

FIG. 1 illustrates a broadband system implementing automatic ONT service configuration for a BSP, under some embodiments. System 100 includes a BSP region 112 that contains two OLT devices 102*a* and 102*b*, each coupled to a respective switch, 104*a* and 104*b*. An OLT typically comprises a number of different ports (denoted p1, p2, . . . , pN), and the switches can couple different ports to one another depending on respective port configurations 106*a*, 106*b*. In a dual redundant system, two OLT devices from the BSP 112 are connected to an ONT device 108 operating in the user environment 114, which can be a house, office, or other similar location. One link between an OLT and the ONT is an active link 116, while the other link is a standby link 118. In case the active link is cut or otherwise rendered inoperative, the standby link will take over and maintain network connectivity between the user and the BSP.

For the embodiment of FIG. 1, system 100 includes an automatic ONT service configuration processing component 110 that provides automated service provisioning for ONT 108 in the protection switching architecture of paired active and standby OLTs 102*a*, 102*b*. This component may be implemented as a geo-redundant cloud-based or centralized network management platform, and is configured to discover and duplicate ONT services from active to standby OLTs. This ensures consistent services and rapid switchover for large numbers (e.g., upwards of millions) of ONTs. Any appropriate network topology and scale may be used. For example, in a large-scale network there may be on the order of hundreds to thousands of OLTs, and thousands of ONTs per OLT.

System 100 thus generally implements a process to automatically provision ONT services (configurations) to paired OLT devices configured as a protection pair (i.e., active and standby OLTs).

It should be noted that component 110 may be implemented as a hardware component comprising a circuit, a software component executing a software program, or as a firmware component comprising both hardware and software elements. The BSP and user sites may include any number of additional processing devices coupled together through a client-server network, such as a local area network (LAN), wide area network (WAN), metropolitan area network (MAN), Internet Protocol (IP) network, cloud network, or any combination of such networks. The network could include different types of links, such as wired links or wireless links. Each device or network element may represent a node in the network and is coupled to at least one or more other nodes for transmission of messages (data packets) in accordance with defined routing protocols.

For broadband networks, Type B+ protection requires a service provider (BSP 112) to continue services to key subscribers, such as government and key infrastructure providers. Switching over the OLT with no service interruption upon break of the active link 116 requires the ONT subscribers services configurations 106*a*, 106*b* are identical and highly consistent on the paired OLT devices. Component 110 provides mechanisms for automatically configuring massive ONT services on the paired OLT to support a rapid switchover.

In an embodiment, a broadband system can provide and support three main classes of services, such as shown in FIG. 2. This is a so-called "triple-play" service model, and component 110 provides automatic way to retrieve, identify, assemble the ONT services configuration parameters to ensure all ONT triple play services are identical and consistent on paired OLT(s). FIG. 2 is a table 200 that lists the three main classes and characteristics of service, such as services 202, service profiles 204, and service parameters 206. The example services 202 include voice, video and data services. Corresponding profiles for each service are shown in column 204, and the corresponding technical parameters for each service are shown in column 206. FIG. 2 is provided for purposes of illustration only, and many other services and constituent profiles and parameters are also possible.

Embodiments of process 110 provide a flexible way to organize the services, such as template synthesis per service type, the use of static and fixed template profiles 204, and support for dynamic or customized parameters 206. The same service profiles and same service parameters are configured on both OLTs 102*a*, 102*b* for one ONT 108. A set of profiles and configuration parameters is provisioned and synced to the OLT before PON protection in the system.

In an embodiment, process 110 comprises certain subprocesses or components to implement the automatic, redundant ONT service configuration feature, as shown in FIG. 3. These include self-organizing OLT groups 302, an independent (e.g., cloud-based) management platform 304, ONT service discovery and normalization 306, and dual ONT service provisioning 308.

The self-organizing OLT group process 302 comprises an automated virtual grouping of active/standby OLT pairs based on configurable rules. These rules can match location, model, capacity, ports, and so on. In general, an OLT connects the BSP to an optical fiber trunk line and essentially functions as a switch or router to function as the service provider endpoint of a PON. OLT devices can be made by various different manufacturers and have different configuration, such as number and types of ports and interfaces. For example, a particular OLT may have four 1G/10G shared SFP+ portions, four GbE RJ45 interfaces, and a management port, while other OLTs may have different configurations. In a typical BSP environment, any number of OLTs may be available in a pool of devices depending on network scale and configuration. The self-organizing OLT group feature of process 110 optimizes OLT pair assignments based on device types and configurations to assign an standby priority to the OLTs.

Figure 4:
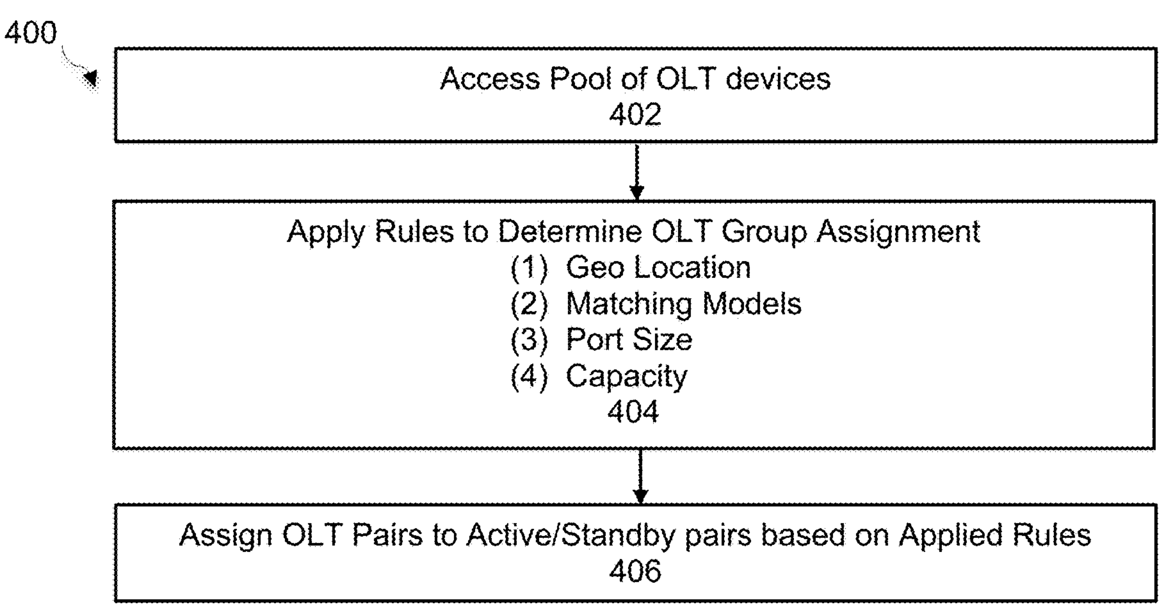
FIG. 4 is a flowchart illustrating a method of self-organizing OLT groups, under some embodiments.

FIG. 4 is a flowchart illustrating a method of self-organizing OLT groups, under some embodiments. As shown in process 400 of FIG. 4, a pool of OLT devices is made available in the broadband network, 402. The optimal pairing or grouping of OLT pairs in an active/standby pairing is determined by applying one or more configurable rules, 404. For the example shown, the rules could be geographical location of the OLTs, model type, port configuration, and capacity, among other possible rules.

For geographic location, each OLT has specific latitude/longitude (or other location) data programmed or input into the device based on where it is located. The geolocation rule could specify that the active device be located in one location, while the standby device should be located in a different location.

Each OLT device is provided as a model (and version) produced by a manufacturer. As shown in block 404, a second rule could be to match the OLT devices by model/version. Serial numbers or other indices can be used to determine and match the devices as an active and standby pair. If exact matches are not possible, the closest or proximal serial/model numbers can be used to provide closely matched pair.

OLT devices can be embodied in various different standalone or shelf-based components, and each OLT device has a specific number of ports of different types and configurations. Another rule may be to match the devices for pairing based on the types of ports and/or the same or closest port number.

Each OLT may also support a specific number of connected ONTs as a capacity limitation. Yet another rule may be to match the OLTs based on the same or proximal capacity of the OLTs.

FIG. 4 lists only some possible rules for matching OLTs as active/standby pairs, and other rules are also possible. The rules may be applied in any order or combination desired to provide an optimal matching scheme based on network configuration and constraints. For example, the rules may be applied using a weighted combination of rule parameters, if necessary. Once the rules are applied, the OLTs are assigned into active/standby pairs, 406.

The data of the rules is retrieved once the OLT added/connected by management system. The grouping assignment is initially organized when the Type B+ protection is enabled at a first time. Thereafter, a user may have a choice to modify the OLT groupings.

The management platform 304 may be provided as a cloud-based or system-based network management system (NMS). The NMS generally comprises geo-redundant servers and databases to provide automated orchestration and provisioning. It utilizes APIs for integration with OLTs and other systems, and is configured to be horizontally scalable to handle large volumes of ONTs.

With reference to FIG. 3, process 110 provides ONT service discovery and normalization process 306. This process discovers and extracts ONT service data from active OLTs. It normalizes this data to a common data model. It also generates normalized service templates. This normalization allows for multi-vendor OLT support.

Figure 5:
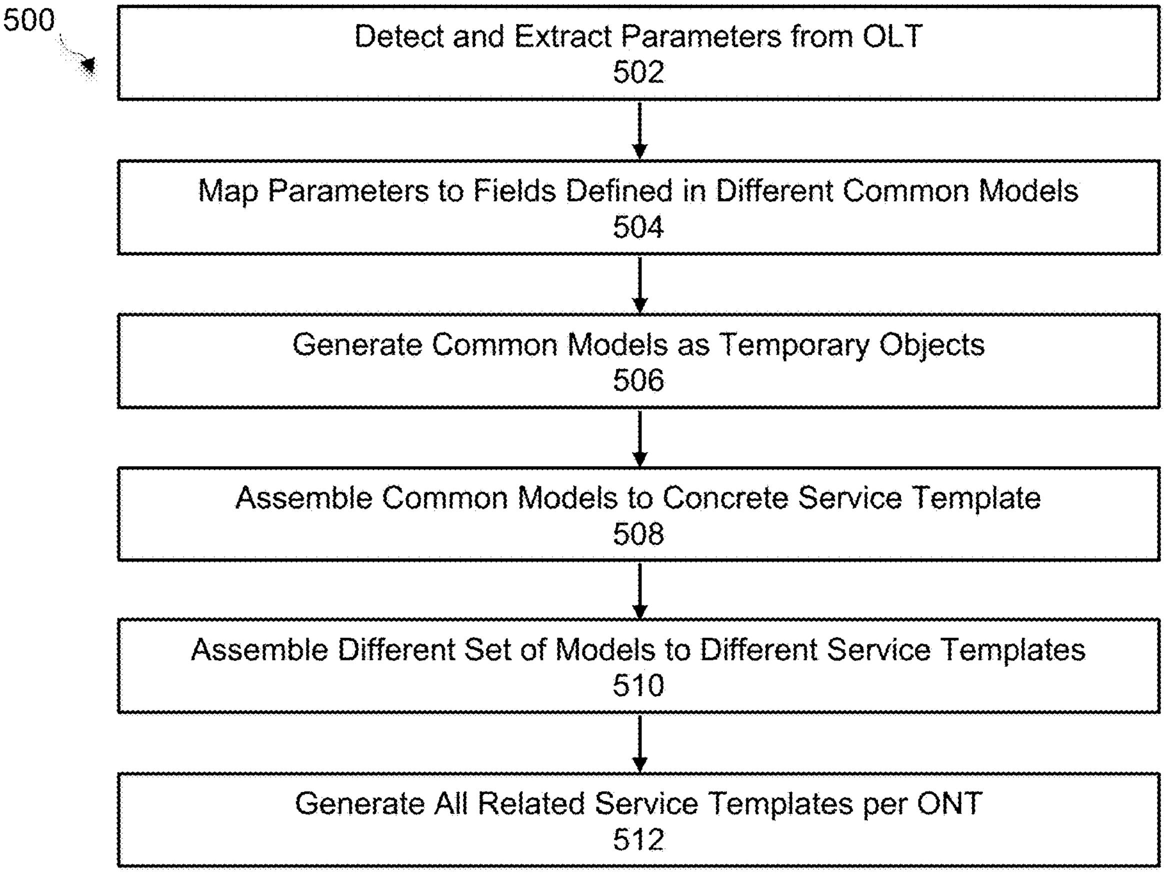
FIG. 5 is a flowchart that illustrates a process of generating a dynamic service template using extracted and normalized ONT service data, under some embodiments.

In an embodiment, the normalized service data is used to generate a dynamic service template. FIG. 5 is a flowchart that illustrates a process of generating a dynamic service template using extracted and normalized ONT service data, under some embodiments. As shown in FIG. 5, process 500 begins with detecting and extracting parameters from the OLT, 502. This may be accomplished through the use of Xpath, or similar program. Xpath is a language used to query different parts of an XML document, and other similar programs may also be used.

As shown in step 504, the raw parameters are then mapped to fields defined in different common models. The process then generates the common models as temporary objects, 506, and assembles the common models to concrete service template, 508. The different set of models can be assembled to different service templates, 510. The process then generates all the related service templates per ONT, 512. The raw parameters also may be referred to as "raw data" and can be found in OLT. The NMS retrieves this raw data from OLT for use by the ONT.

Figure 6:
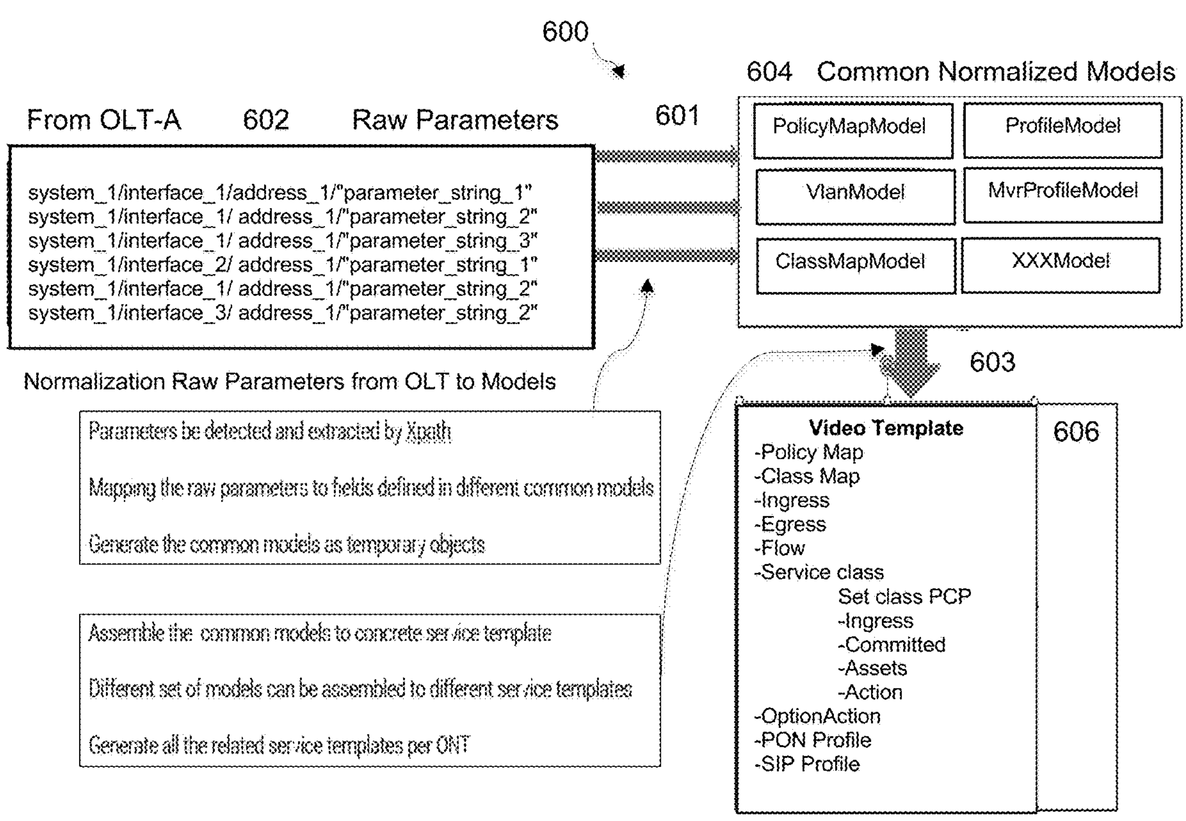
FIG. 6 graphically illustrates generation of a dynamic template from extracted OLT parameter data, under some embodiments.

FIG. 6 graphically illustrates generation of a dynamic template from extracted OLT parameter data, under some embodiments. Diagram 600 of FIG. 6 shows a set of raw parameters 602 from an OLT (OLT-A). These parameters may be any relevant operational or configuration data regarding the OLT. The example text 602 is for illustration only, and any set of parameters in any appropriate format is possible.

Through process 601 (comprising steps 502 to 506 of FIG. 5), the raw parameters are used to generate the common normalized models 604, of which certain examples out of any possible set of models is shown. For the example of FIG. 6, these comprise a policy map model, a Vlan model, a class map model, a multicast profile model, a Mvr profile model, and other possible models. The normalized models are then assembled to generate, in process 603, the service template 606, such as a video template, as shown. Any format of template may be used, and 602 is provided for purposes of illustration only.

Figure 7:
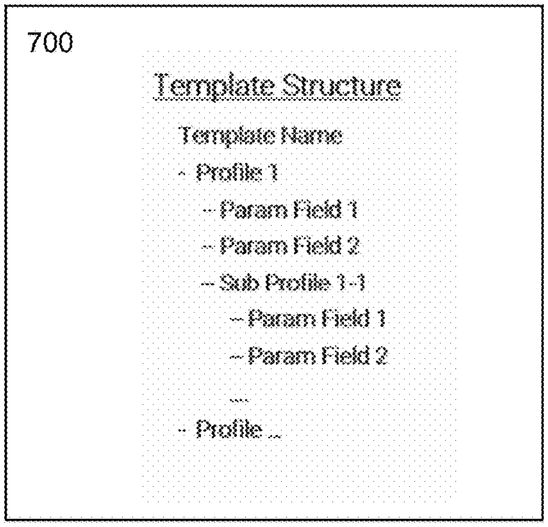
FIG. 7 illustrates an example dynamic template structure, under some embodiments.

In an embodiment, the dynamic template is generated in reverse generation procedure. FIG. 7 illustrates an example dynamic template structure, under some embodiments. As shown in FIG. 7, template structure 700 comprises a template name with a first profile (Profile 1) with different parameter fields (Param Field 1, Param Field 2), and a sub-profile (Sub Profile 1-1) with its own parameter fields (Param Field 1, Param Field 2), and so on. FIG. 7 is provided for purposes of example only, and any number of profiles, sub-profiles, parameters, and so on may be used.

FIG. 8 illustrates generating a dynamic template by mapping extracted device configuration models to common normalized models, under some embodiments. As shown in diagram 800, the parameters 802 for an active OLT (OLT-A) are extracted and then mapped through the map and conversion process 804 to generate the template 806, such as the example video template shown. The template 806 is then used to reconfigured the standby OLT (OLT-S) to create the configuration of parameters as model 810 of OLT-S. In this manner, the standby OLT-S is configured identically to the active OLT-A through the use of the dynamic template 806 through the reconfiguration step 808.

In diagram 800, the system first gets model data 802 for the OLT-A in the NMS system and then converts this model data to common normalized models which can be used to generate the dynamic template 806. The NMS system then performs reconfiguration 808 of the standby OLT using the dynamic template 806 to create the template 810 on OLT-S. The parameter data 802 that is used to create the template 806 may be provided in any appropriate format, such as a model (as shown in FIG. 8) or as raw device protocol data, or any other data format that can be detected and extracted.

FIG. 8 illustrates an example in which a standby OLT is configured to be identical to an active OLT, however, any two OLT devices can be identically configured depending on system configuration, such as standby to active, and so on. The template format, content, and programming code of FIG. 8 is provided for illustration only, and any appropriate content, data, and code may be used.

With reference to FIG. 3, the dual ONT service provisioning process 308 provisions the global parameters and profiles to OLT pairs. It also provisions duplicate ONT service templates to active/standby OLTs to ensure consistency between OLTs. The parallel processing of the system enables rapid switchover in the event of link failures.

In an embodiment, a global profile is synchronized between OLT pairs in a bi-directional manner. Two-phase provisioning is used to differentiate the global system configurations efficiently. OLT global profiles are referred and used by ONT service configurations, and OLT global profiles can be shared by many ONT service configurations. This happens when the OLT-A and the OLT-S are first paired as Type B+ protection devices.

In an embodiment, the system implements a two-phase process where a first phase (phase 1) pushes global system profiles/parameters to the OLT, and the second phase (phase 2) pushes individual ONT service configurations to the OLT by a dynamic service template. The ONT service configurations are used in the global profiles/parameters so these global system profiles/parameters must exist and be configured before configuration in phase 2. The dynamic service template is thus mainly used in phase 2. In addition, the global profiles can be shared or referred to by different ONTs in service provisioning. The global profiles shall be identical between the paired OLTs in the Type B+ protection case. This can be achieved as shown and described with respect to FIG. 9 and FIG. 10 below.

Figure 9:
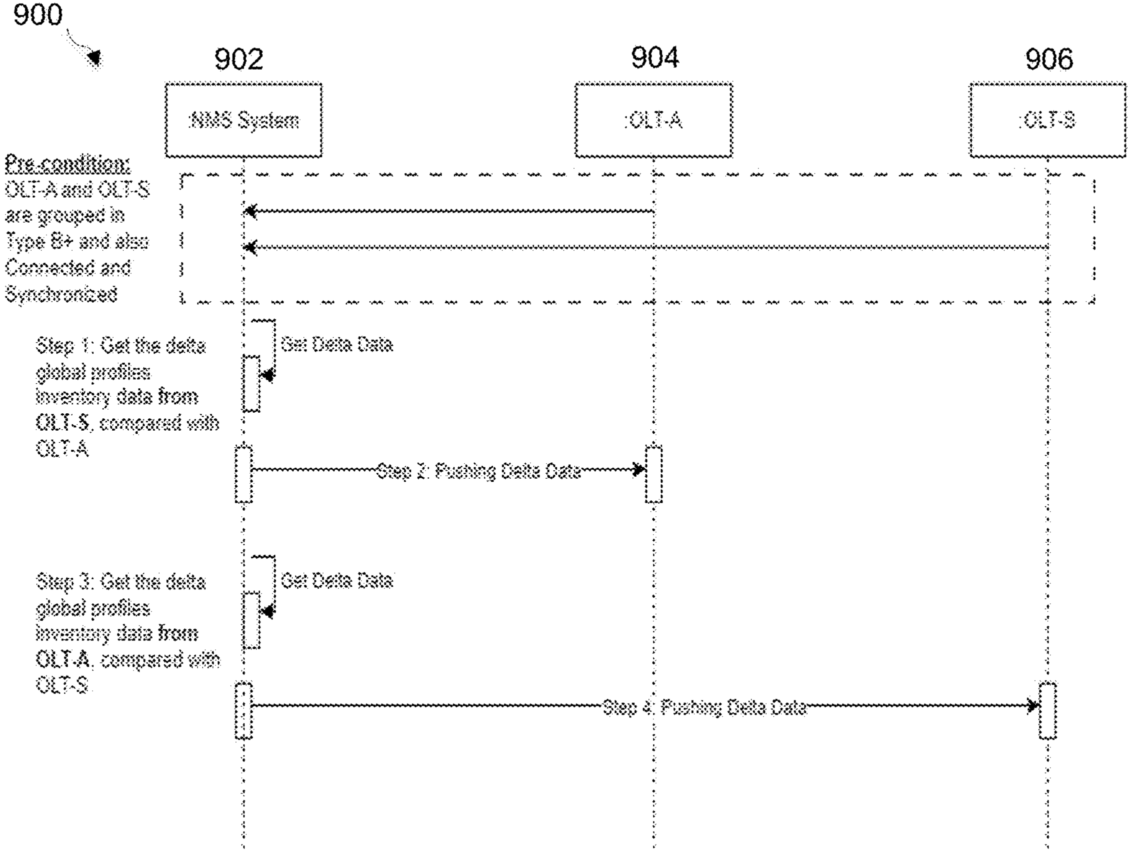
FIG. 9 is a diagram that illustrates a process of global profile synchronization, under some embodiments.

FIG. 9 is a diagram that illustrates a process of global profile synchronization, under some embodiments. As shown in FIG. 9, process 900 operates between NMS system 902, active OLT-A 904, and standby OLT-S 906. Process 900 is performed when OLT-A and OLT-S are grouped for Type B+ protection and are connected and synchronized. When OLT-A and OLT-S are connected and synchronized, the NMS system can keep the global profiles data for both. The NMS system can then compare the global profiles between them and push any difference (delta) data on these global profiles and ensure the global profiles are ultimately identical.

The global profile sync process starts (step 1) by the NMS getting delta global profile data from OLT-S as compared to OLT-A. Data that is different between the two OLTs as revealed by the comparison comprises "delta" data. The NMS then pushes the delta data to the OLT-A (step 2). The next gets delta global profile data from OLT-A as compared to OLT-S(step 3), and pushes this delta data to the OLT-S.

Figure 10:
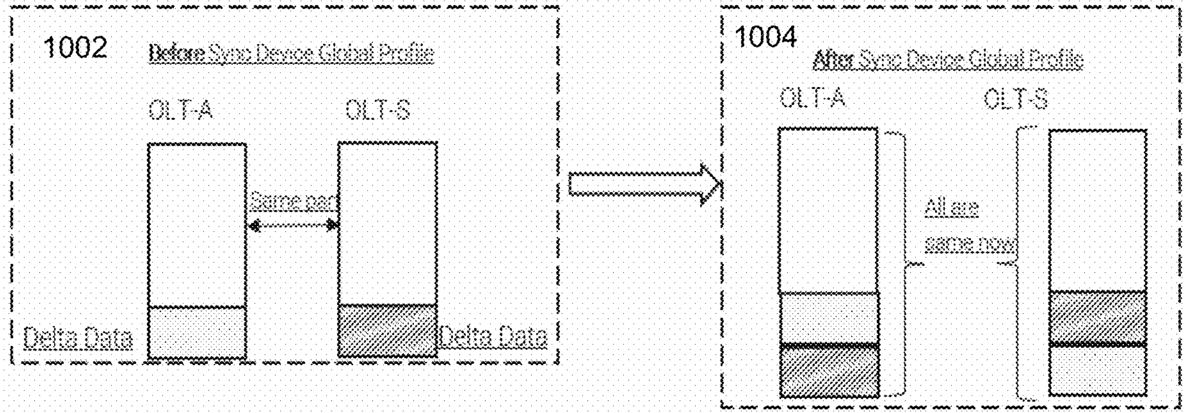
FIG. 10 illustrates the result of delta data synchronization between two OLTs, under some embodiments.

FIG. 10 illustrates the result of delta data synchronization between two OLTs, under some embodiments. As shown in FIG. 10, the OLT-A and OLT-S each contain some amount of same data, and some amount of respective delta data, as shown in the before sync state diagram 1002. After the delta data from each OLT is pushed to the other OLT, each OLT contains both the same data and both sets of delta data, as shown in the after sync state diagram 1004. In this manner, OLT-A and OLT-S are synced with respect to global device profiles.

FIG. 9 illustrates a method of synchronizing two OLT (e.g., active and standby) together. Embodiments further include processes for synchronizing (duplicating) ONT services to OLT devices. FIG. 9 illustrates the synchronizing of two OLT for global profiles. These global profiles would also be used for ONT service provisioning as shown in FIG. 8. The ONT services are also provisioned to the OLT by NMS system. Since NMS system cannot have interactions with ONT directly, the ONT services needed by the ONT are provisioned by the NMS.

Synchronizing the system by duplicating ONT services to one or more OLT devices can be done in a variety of instances, such as when a new ONT is added, or when an ONT exists but other network circumstances change, such as a new OLT, and so on.

The two main circumstances for ONT to OLT duplication occur when a new ONT is added, or when an ONT exists before a standby OLT is joined. When new ONT arrival, then the service provisioning shall happen on the paired OLT(s) by a pre-defined service template. A dual service provisioning is then triggered. In this case the service template is pre-defined and not dynamic, as described further with respect to FIG. 11 below.

For the case where an ONT exists before the standby OLT is joined, the standby OLT is discovered and grouped with an active OLT as one pair (as described further with respect to FIG. 12 below). This produces a Type B+ protection group. In this case, the NMS gets the ONT service configuration data from the active OLT and duplicates this to the standby OLT. If there are many ONTs for an active OLT, then multiple duplications on these ONTs would be taken.

Figure 11:
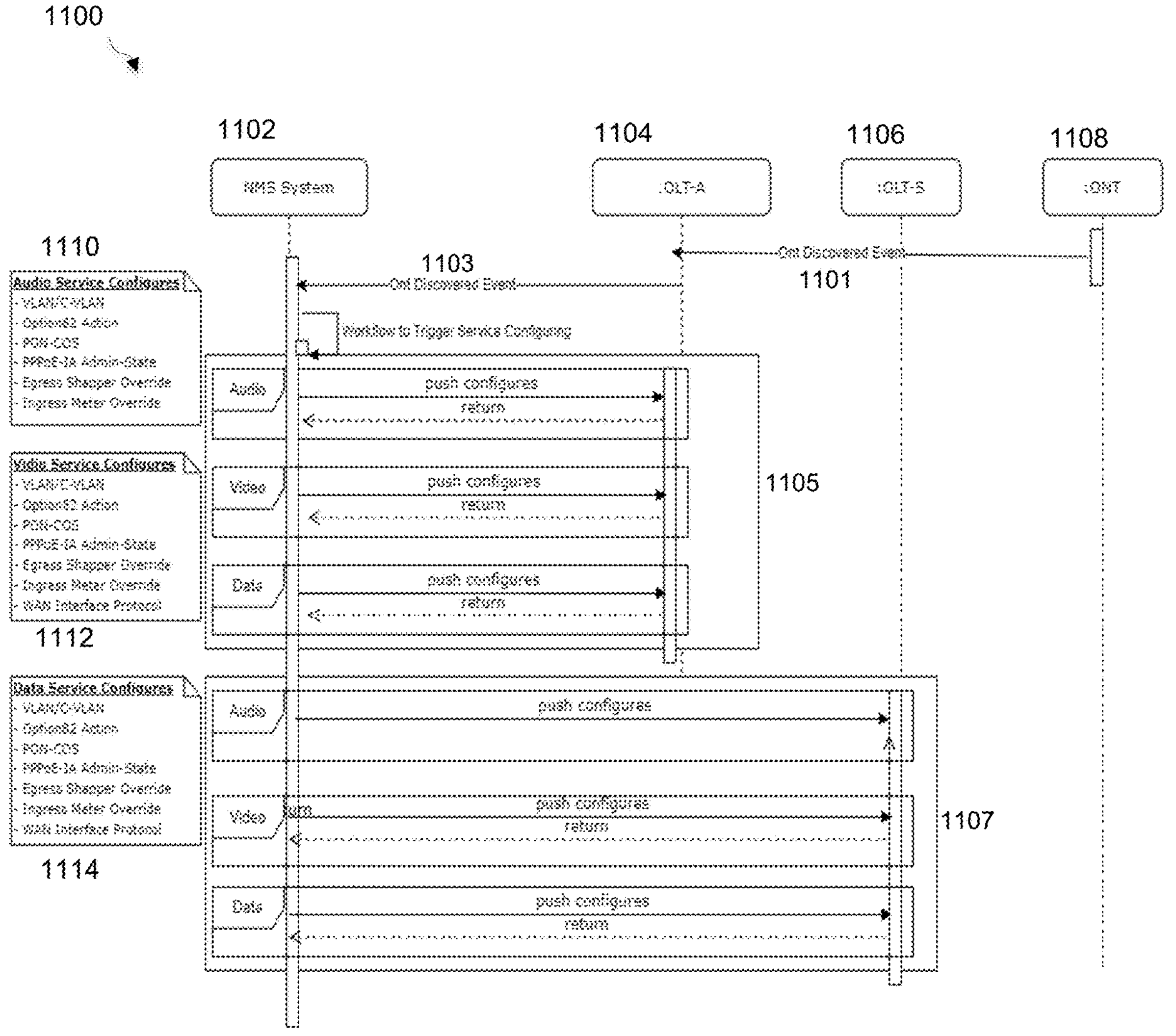
FIG. 11 illustrates a process for duplicating ONT services to an OLT for a new ONT added to the system, under some embodiments.

FIG. 11 illustrates a process for duplicating ONT services to an OLT for a new ONT added to the system, under some embodiments. For process 1100 of FIG. 11, settings for an ONT 1108 are duplicated over to the active and standby OLTs 1104 and 1108 by the NMS system 1102. For this process, it is assumed that OLT-A and OLT-S have been grouped as one pair for Type B+ protection, and that the ONT is newly discovered by an OLT.

Upon power-on, the ONT 1108 is started and discovered by both OLT-A and OLT-S, 1101. The OLT-A sends a message (e.g., ONT arrival event) 1103 to the NMS system 1102 to indicate the presence of ONT 1108. With respect to the discovery and messaging, upon ONT power-on, the ONT linked to a PON port within the active OLT. The OLT knows there is one ONT up and raises an ONT arrival event, which it transmits to the NMS, as the active OLT stays connected with NMS system. The NMS receives the event and performs triggering actions like pushing ONT services on the paired active/standby OLTs. Thus, as shown in step 1102, the NMS 1102 checks that the ONT 1108 connected an OLT is in Type B+ protection mode, and then starts a dual ONT service provisioning process on both OLT-A and OLT-S.

FIG. 11 illustrates an example in which the ONT has three service templates, audio service configurations 1110, video service configurations 1112, and data service configurations 1114. These are shown for purposes of illustration only, and other or different services and templates may also be used.

The same ONT service configurations as defined in the services templates are provisioned to both OLT-A and OLT-S in parallel. Thus, as shown, the audio/video/data services configurations are pushed to OLT-A in provisioning cycle 1105, and the audio/video/data configurations are simultaneously pushed to OLT-S in provisioning cycle 1107 from the NMS 1102. Each provisioning cycle can include a push of a template to the OLT, and a return from the OLT back to the NMS. After this process completes, the ONT services configurations of the ONT are consistent on both OLT-A and OLT-S.

FIG. 11 illustrates a case in which the ONT to OLT-A and OLT-S synchronization is performed for a newly discovered ONT. In the case where the ONT already exists in the system, the OLT synchronization process has two possibilities, one in which the OLT-S is added later, and the second in which the OLT-A and OLT-S are not initially connected to the NMS.

Figure 12:
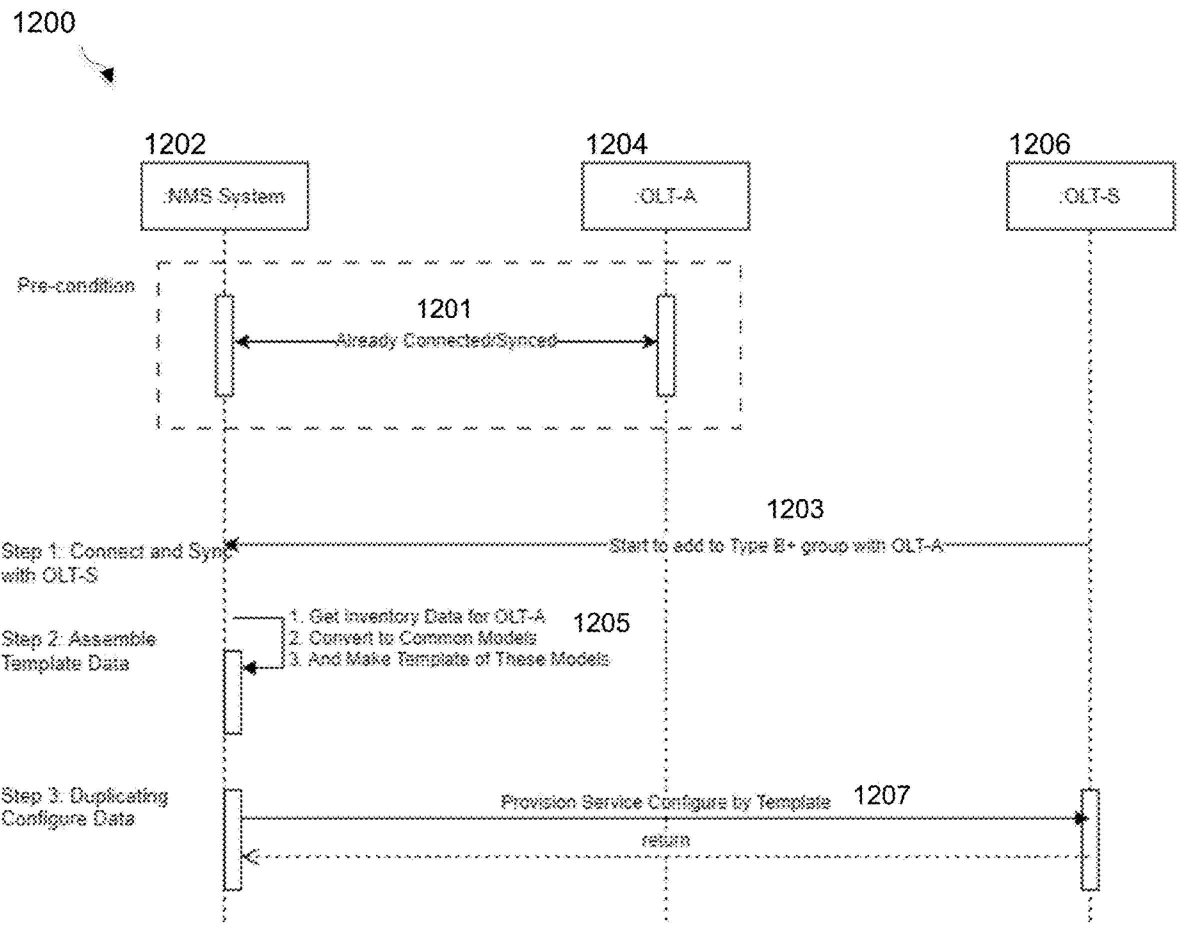
FIG. 12 illustrates a process for duplicating ONT services to an OLT for a later added OLT, under some embodiments.

FIG. 12 illustrates a process for duplicating ONT services to an OLT for a later added OLT, under some embodiments. For the example process 1200 of FIG. 1, NMS 1202 synchronizes the configuration for an ONT (not shown) to the active and standby OLTs 1204 and 1206. It is assumed that OLT-A is already connected 1201 to NMS 1202 and OLT-S added later. Thus, OLT-A has been already connected/synced to NMS 1202 before Type B+ enabled with OLT-S. As a first step (step 1) OLT-S starts to connect to NMS 1202 over connection 1203.

In step 2, the NMS 1202 extracts the ONT services from inventory data for OLT-A, and then normalizes the inventory data model to common models, as described above. The NMS then assembles the common models to ONT service template data as dynamic template for each of ONT, as shown in sequence 1205. After this, the NMS re-provisions the ONT services to OLT-S by the generated dynamic template, 1207.

As stated above, instead of a single OLT added, a pre-configured pair of OLTs may be added together for configuration by an NMS. FIG. 13 illustrates a process for duplicating ONT services to an unconnected pre-configured OLT pair, under some embodiments. Process 1300 duplicates ONT services for an existing ONT (not shown) to Type B+ paired OLTs. For the example of FIG. 13, OLT-A (1304) and OLT-S) 1306) are a pre-configured pair as Type B+ but are not initially connected to NMS 1302, as shown in pre-condition state 1301. As a first step (step 1), OLT-A is discovered and connects with the NMS 1302 and is synchronized, 1303. In step 2, OLT-S then starts to connect to the NMS, 1305. In step 3, through sequence 1307, the NMS 1302 extracts the protocol data related to the ONT services data from OLT-A, and then normalizes the raw protocol data model to common models. The NMS then assembles the common models to ONT service template data as dynamic template for each OLT. It then re-provisions the ONT services to OLT-S by the generated dynamic template, 1309.

In general, the ONT services are pushed to the OLTs by the NMS. In this case, the ONT services are for an existing ONT, and the NMS needs push the ONT services to OLT. The NMS system does not have interaction with ONT directly. This is due to the fact that there are many PON port configurations or ONT services known by the OLT, so the NMS must push them to OLT.

Figure 14:
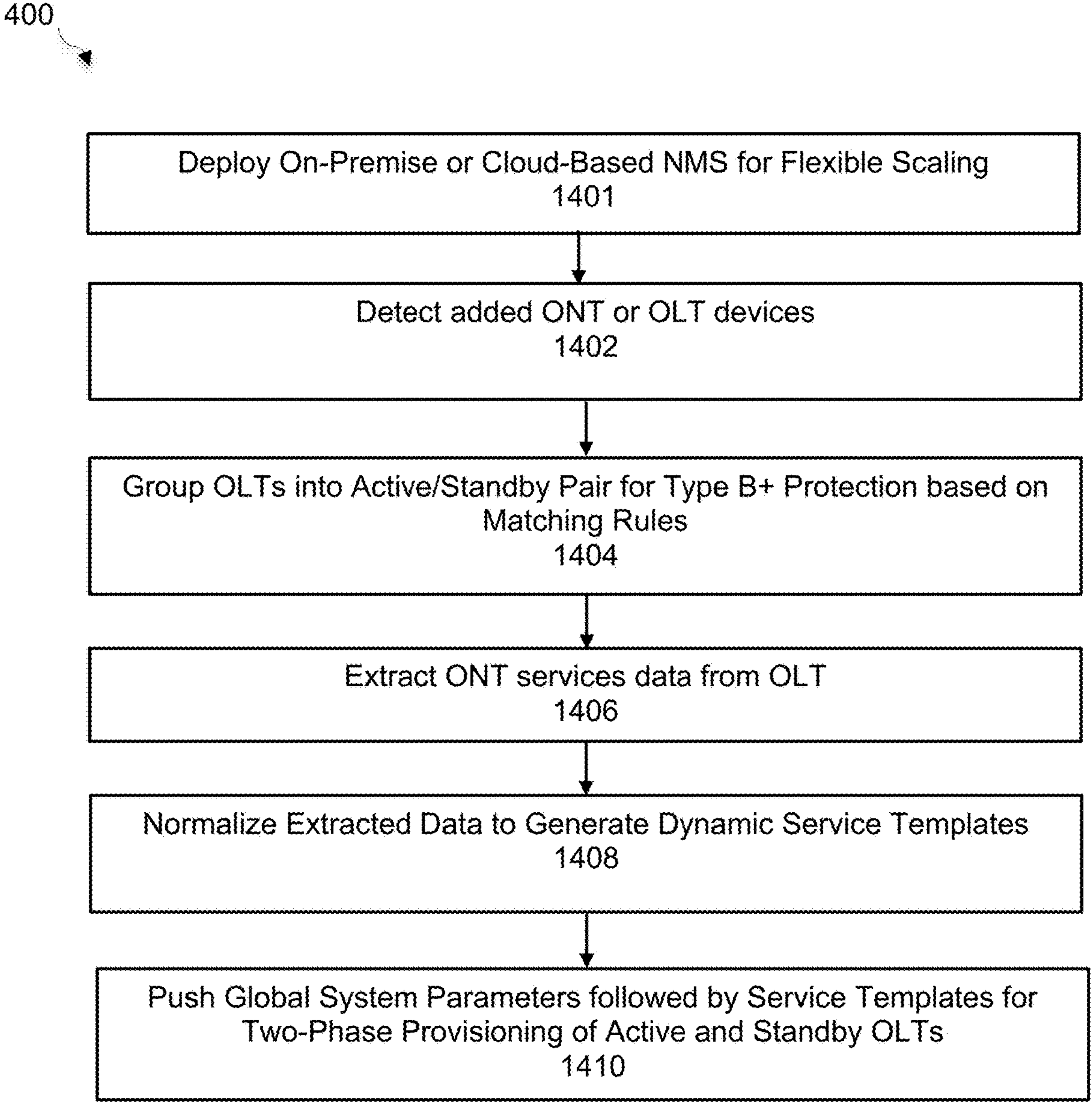
FIG. 14 is a flowchart that illustrates an overall method of automatically configuring paired OLTs using an extracted ONT template for a PON protection network, under some embodiments.

FIG. 14 is a flowchart that illustrates an overall method of automatically configuring paired OLTs using an extracted ONT template for a PON protection network, under some embodiments.

For the embodiment of process 1400, an NMS system is deployed as either an on-premise or cloud-based controller system to enable flexible and scalable architectures, 1401. The NMS coordinates the synchronization of OLT devices into a protection pair for ONT devices deployed in user locations. Depending on initial system configuration, the synchronization process 1400 may be triggered by the detection 1402 of an added or changed ONT or OLT device, such as through the processes illustrated in FIGS. 11, 12, and 13.

Process 1400 self-organizes the OLTs into a protection group by automatically assigning active and standby OLTs into pairs based on configurable matching rules, 1404.

The NMS extracts ONT services data from the OLT for all of the relevant services supported and used by the ONT, 1406. The NMS normalizes this extracted data into a common and consistent format that is compatible across different OLT models and versions. This normalized data is then used to generate dynamic templates for each service of the ONT, 1408. The NMS then synchronizes the OLTs through a two-phase provisioning process that first pushes global system profiles/parameters to the OLTs followed by individual ONT service templates to improve efficiency, 1410.

The process thus involves pushing the global system profiles and parameters to the protection pair to effect a two-phase provisioning of each OLT. The two-phase provisioning is performed on the two OLT devices of the protection pair. In phase 1, the system pushes global system profiles/parameters to the OLTs, and in phase 2, the system pushes individual ONT service configurations to OLTs by the dynamic service template.

The ONT service configurations (e.g., profiles or parameters) may need to use the global profiles/parameters. This means that the global system profiles/parameters must exist and be configured before configuring the ONT service in Phase 2. In addition, the global profiles can be shared or referred by different ONT(s) in service provisioning. The global profiles shall be identical between the paired OLTs in Type B+ case.

Upon execution of process 1400, the OLTs in a protection pair are identically configured based upon ONT services parameters, and a standby OLT is able to immediately take over from a failed active OLT with minimal latency and data loss.

Embodiments thus provide a system and method to automate service provisioning for ONTs in a protection switching architecture consisting of paired active and standby OLTs. The system utilizes a cloud-based or centralized NMS with geo-redundant servers to discover existing ONT services on active OLTs and automatically duplicate the services to the ONTs on paired standby OLTs. This ensures consistent ONT services and minimizes downtime during protection switching events. It automates complex provisioning processes, ensures service consistency during switchover, minimizes service downtime during switchover, and allows for rapid provisioning for potentially massive numbers of ONTs.

As described above, embodiments include certain components that acts as client or server devices in a broadband network. Any such component may be implemented as a computer implemented software process, or as a hardware component, or both in a computing device such as a node or gateway. As such, it may be an executable module executed by the one or more computers in the network, or it may be embodied as a hardware component or circuit provided in the system. The network environment may comprise any number of components coupled over the Internet or similar large-scale network or portion thereof. Each node in the network(s) comprises a computing device capable of executing software code to perform the processing steps described herein.

A processing component may include a processor and a computer-readable storage medium, along with other components, such as input/output (I/O) interfaces, buffers, power circuits, and so on. The processor may include, for example, general purpose microprocessors, instruction set processors and/or associated chipsets and/or reconfigurable processors and/or special purpose microprocessors (for example, application specific integrated circuits (ASICs)), and the like; and it may be a single processing unit or a plurality of processing units for performing different actions of the method flow according to the embodiments of the present disclosure.

The computer-readable storage medium may be any medium that may contain, store, communicate, propagate, or transport instructions. For example, readable storage medium 920 may include but is not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

The computer-readable storage media may include a computer program 921 that may include code/computer-executable instructions that, when executed by a processor cause it to perform the method flows described herein.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a tangible (physical) computer-readable medium.

Instructions may be executed by one or more processors, such as one or more DSPs, general purpose microprocessors, ASICs, FPGAs, or other equivalent integrated or discrete logic circuitry. Accordingly, the term "processor" or "controller" as used herein may refer to any of the foregoing structure or any other structure suitable for implementation of the techniques described herein. Furthermore, the techniques could be fully implemented in one or more circuits or logic elements. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of automatically provisioning optical network terminal (ONT) device services in a broadband network, comprising:

organizing into a protection pair, optical line terminal (OLT) devices coupled to the ONT device over the broadband network, wherein a first OLT device functions as an active OLT, and a second OLT device functions as a standby OLT;

extracting ONT service data for each service provided to a user, and comprising parameters for a respective service;

normalizing the extracted service data into a consistent format for a variety of different OLT devices;

generating a service template using the normalized extracted service data; and pushing the service template to each OLT of the protection pair to synchronize each OLT to each other and the ONT with respect to the parameters for the respective service.

2. The method of claim 1 further comprising:

obtaining global system profiles and parameters for the broadband network; and pushing the global system profiles and parameters to the protection pair to effect a two-phase provisioning of each OLT.

3. The method of claim 1 wherein the broadband network comprises a passive optical network (PON) operated by a Broadband Service Provider (BSP), and wherein the OLT devices operate at a BSP location and the ONT operates at a site of the user.

4. The method of claim 3 wherein the PON implements a Type B+ dual-homing protection scheme.

5. The method of claim 3 further comprising deploying a network management system (NMS) as either a Cloud-based component or BSP site component to control the OLT and ONT devices.

6. The method of claim 1 wherein the protection pair is formed based on configurable matching rules for the active OLT and standby OLT.

7. The method of claim 6 wherein the configurable matching rules comprise at least one of geographic location, device make and model, device port configuration, and device capacity, either alone or in combination.

8. The method of claim 1 wherein an ONT service comprises one or more network or application programs facilitated by the ONT for access by the user to the broadband network.

9. The method of claim 8 wherein the service data comprises settings for one or more components of the service for interfacing with the broadband network through the active OLT.

10. The method of claim 1 further comprising at least one of detecting an addition of a new ONT to the broadband system, or detecting an addition to a single OLT or OLT protection pair to the broadband system.

11. The method of claim 1 wherein the template comprises a defined template structure including a template name, and one or more profiles, each having parameter fields to store the parameters for the respective service.

12. The method of claim 11 wherein the extracting step comprises accessing raw data for the parameters for the ONT from the OLT and transforming the raw data into normalized data for the respective service.

13. A method for automatically provisioning optical network terminal (ONT) services onto a protection pair of active and standby optical line terminal (OLT) devices in a broadband network, comprising:

obtaining global setting information for the broadband network;

accessing raw data for ONT services provided to a user;

transforming the raw data into a normalized and consistent format;

generating a template for the transformed data; and pushing the global setting information and template onto the OLT devices to automatically synchronize a configuration of each OLT to allow the standby OLT to act as the active OLT in an event of failure of an original active OLT.

14. The method of claim 13 wherein the raw data comprises heterogeneous ONT service configurations, and wherein the transforming step produces a consistent format that is compatible across different OLT models and versions.

15. The method of claim 14 wherein the protection pair is formed based on configurable matching rules for the active standby OLT devices, and further wherein the configuration rules comprise at least one of geographic location, device make and model, device port configuration, and device capacity, either alone or in combination.

16. The method of claim 14 wherein the broadband network comprises a passive optical network (PON) operated by a Broadband Service Provider (BSP), and wherein the OLT devices operate at a BSP location and the ONT operates at a site of the user, and further wherein the PON implements a Type B+ dual-homing protection scheme.

17. The method of claim 13 wherein the service data comprises settings for one or more components of the service for interfacing with the broadband network through the active OLT.

18. The method of claim 17 wherein the template comprises a defined template structure including a template name, and one or more profiles, each having parameter fields to store the parameters for the respective service.

19. A system comprising:

a broadband network;

an optical network terminal (ONT) in a user location providing access and services to the user from the broadband network;

a protection pair of active and standby optical line terminal (OLT) devices in a provider location of the broadband network; and a network management system (NMS) obtaining global setting information for the broadband network, accessing raw data for ONT services provided to the user, transforming the raw data into a normalized and consistent format, generating a template for the transformed data, and pushing the global setting information and template onto the OLT devices to automatically synchronize a configuration of each OLT to allow the standby OLT to act as the active OLT in an event of failure of an original active OLT.

20. The system of claim 19 wherein the broadband network comprises a passive optical network (PON) operated by a Broadband Service Provider (BSP), and wherein the OLT devices operate at a BSP location and the ONT operates at a site of the user, and further wherein the PON implements a Type B+ dual-homing protection scheme, and yet further wherein the NMS is deployed as either a Cloud-based component or BSP site component to control the OLT and ONT devices.

* * * * *